May 18, 1965 W. E. JOHNSON ETAL 3,183,668
PERCUSSION TYPE ROCK DRILLS
Filed Nov. 30, 1959 8 Sheets-Sheet 1
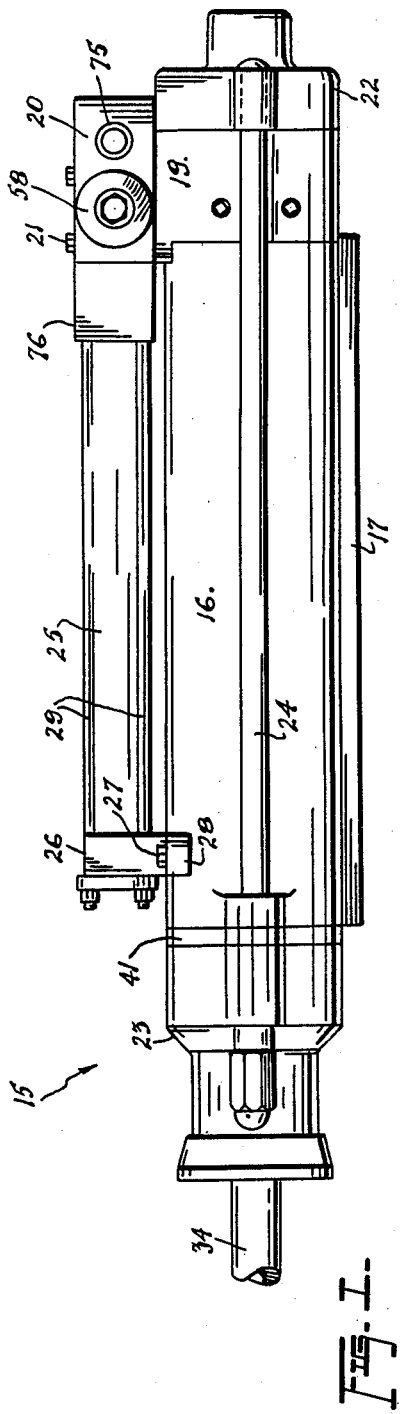
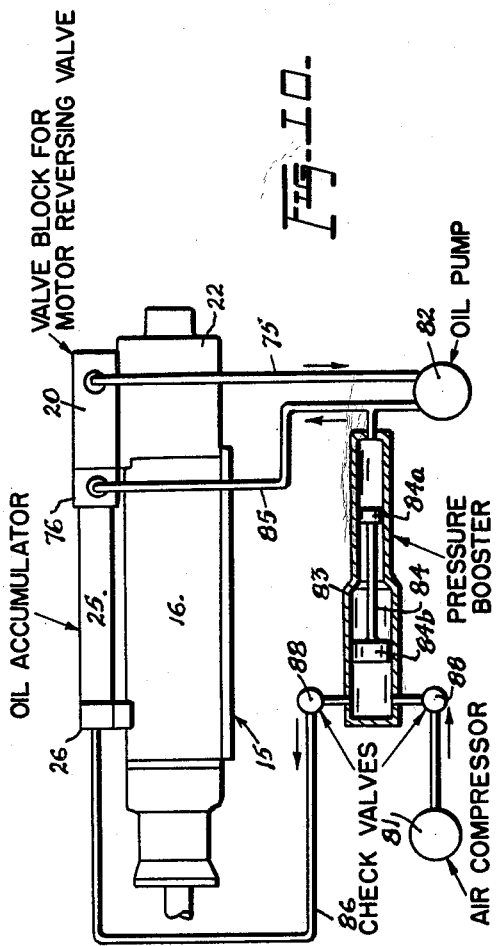
Inventors:
William E. Johnson
Jerry R. Lairson
By Munson Hare
Atty.

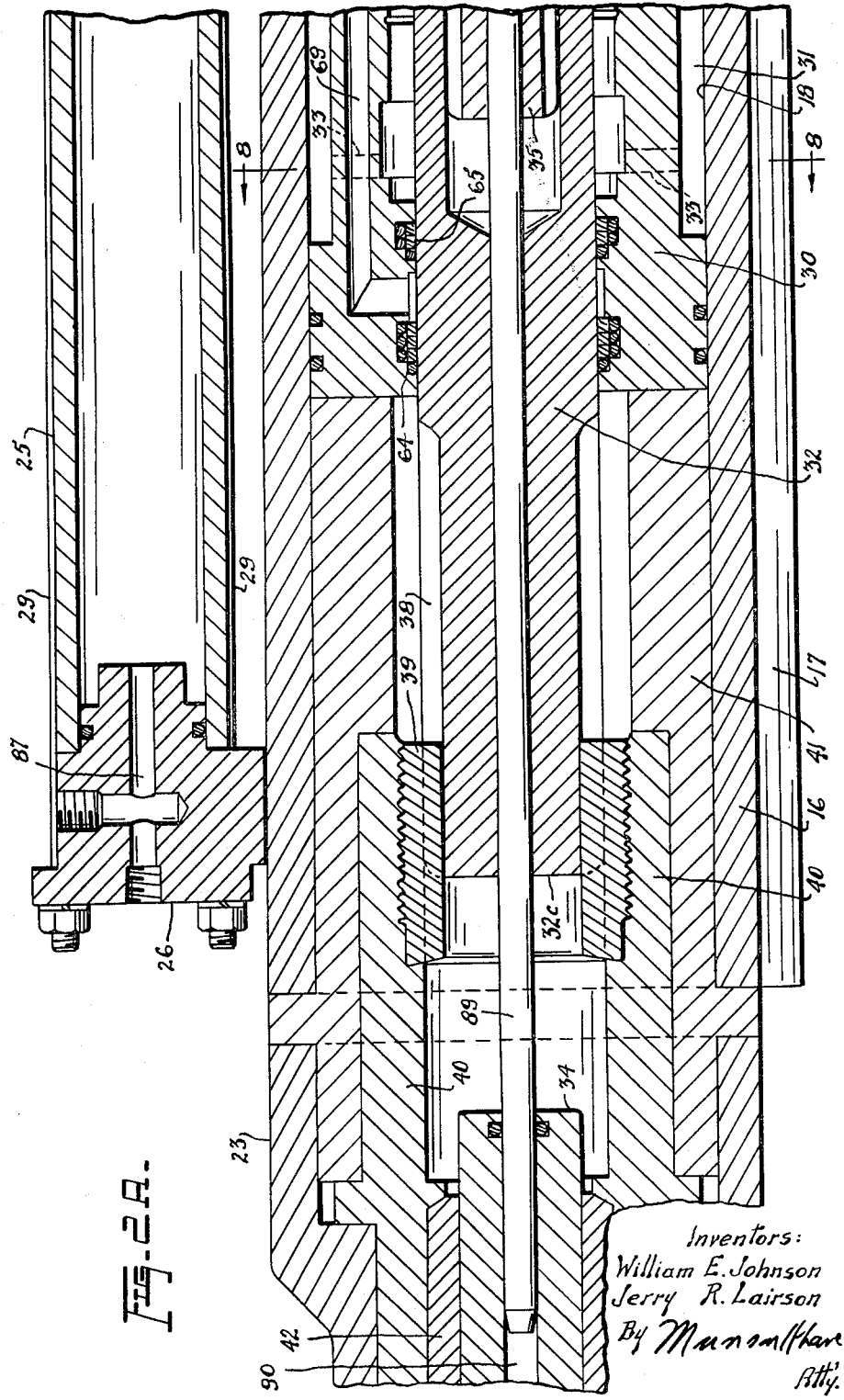

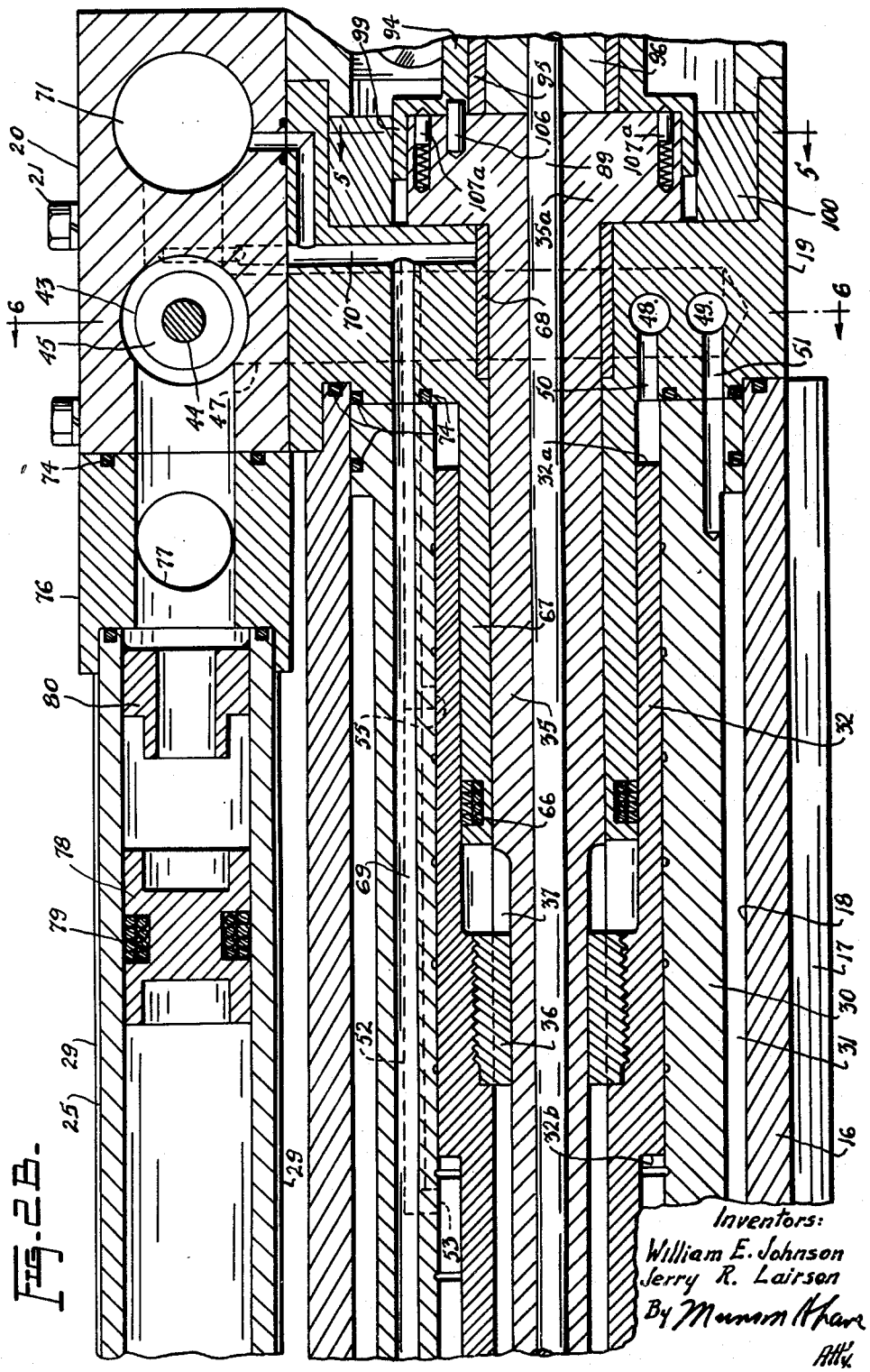

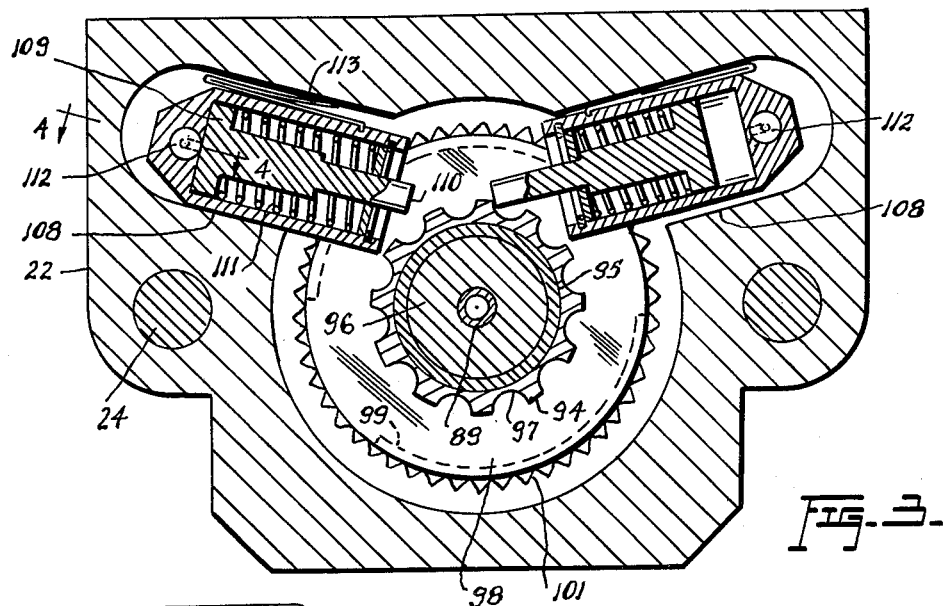
Fig. 3.
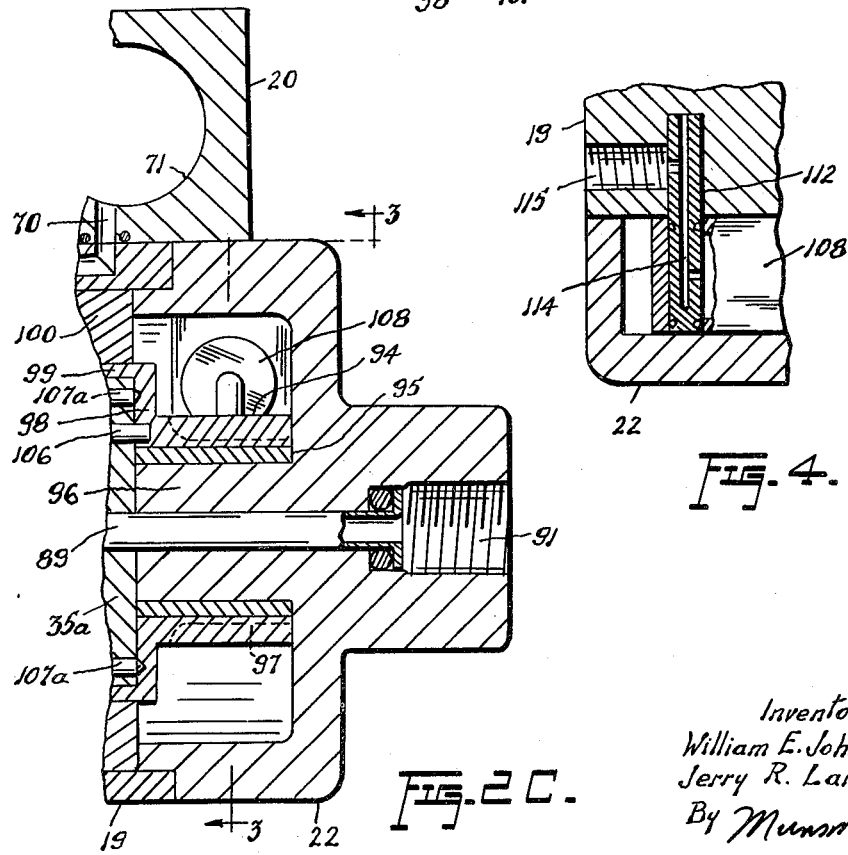
Fig. 2C.
Fig. 4.
Inventors:
William E. Johnson
Jerry R. Lairson
By Munson Hare
Atty.

May 18, 1965   W. E. JOHNSON ETAL   3,183,668
PERCUSSION TYPE ROCK DRILLS
Filed Nov. 30, 1959   8 Sheets-Sheet 5

Inventors:
William E. Johnson
Jerry R. Lairson
By Munson & Lane
Atty.

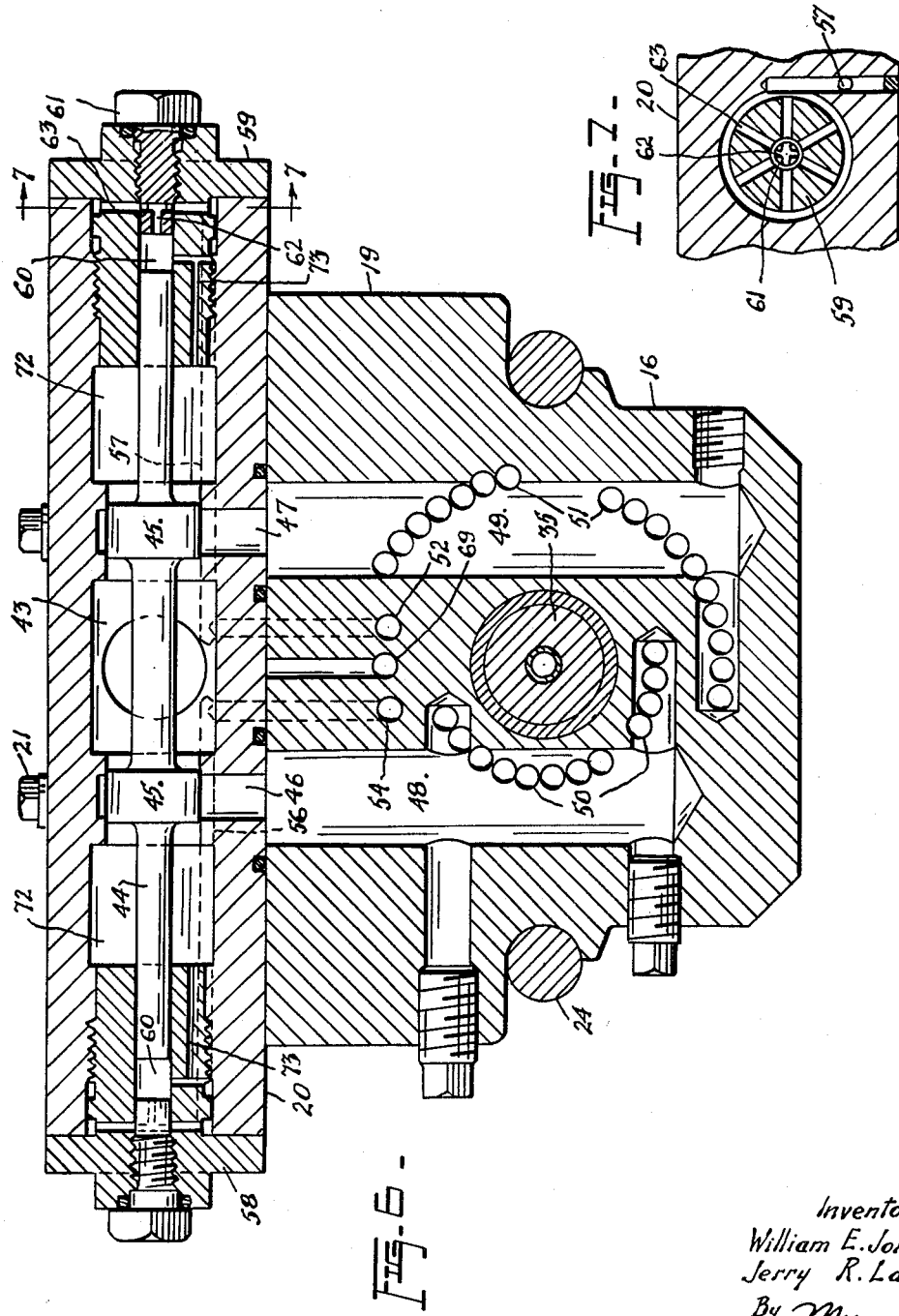

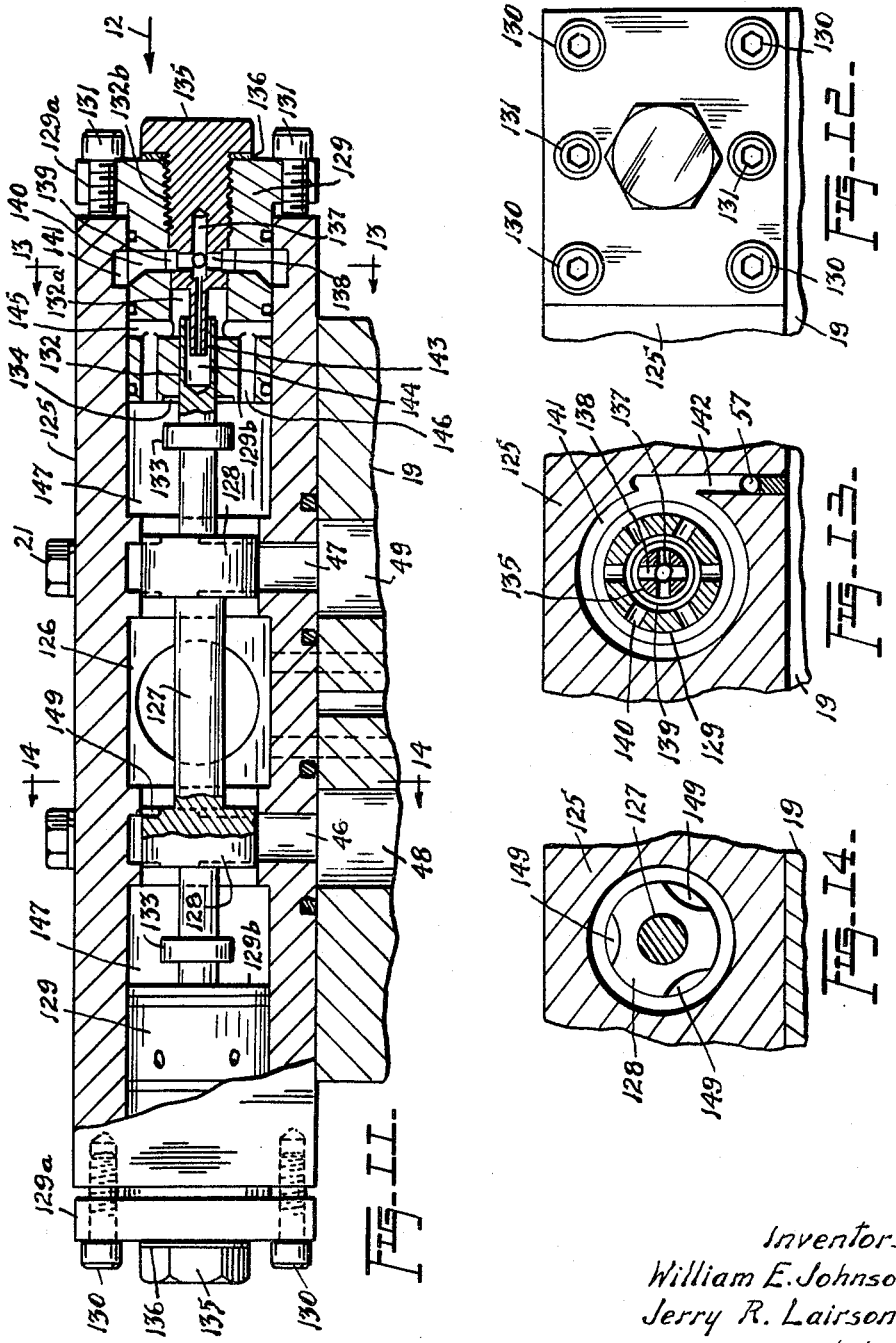

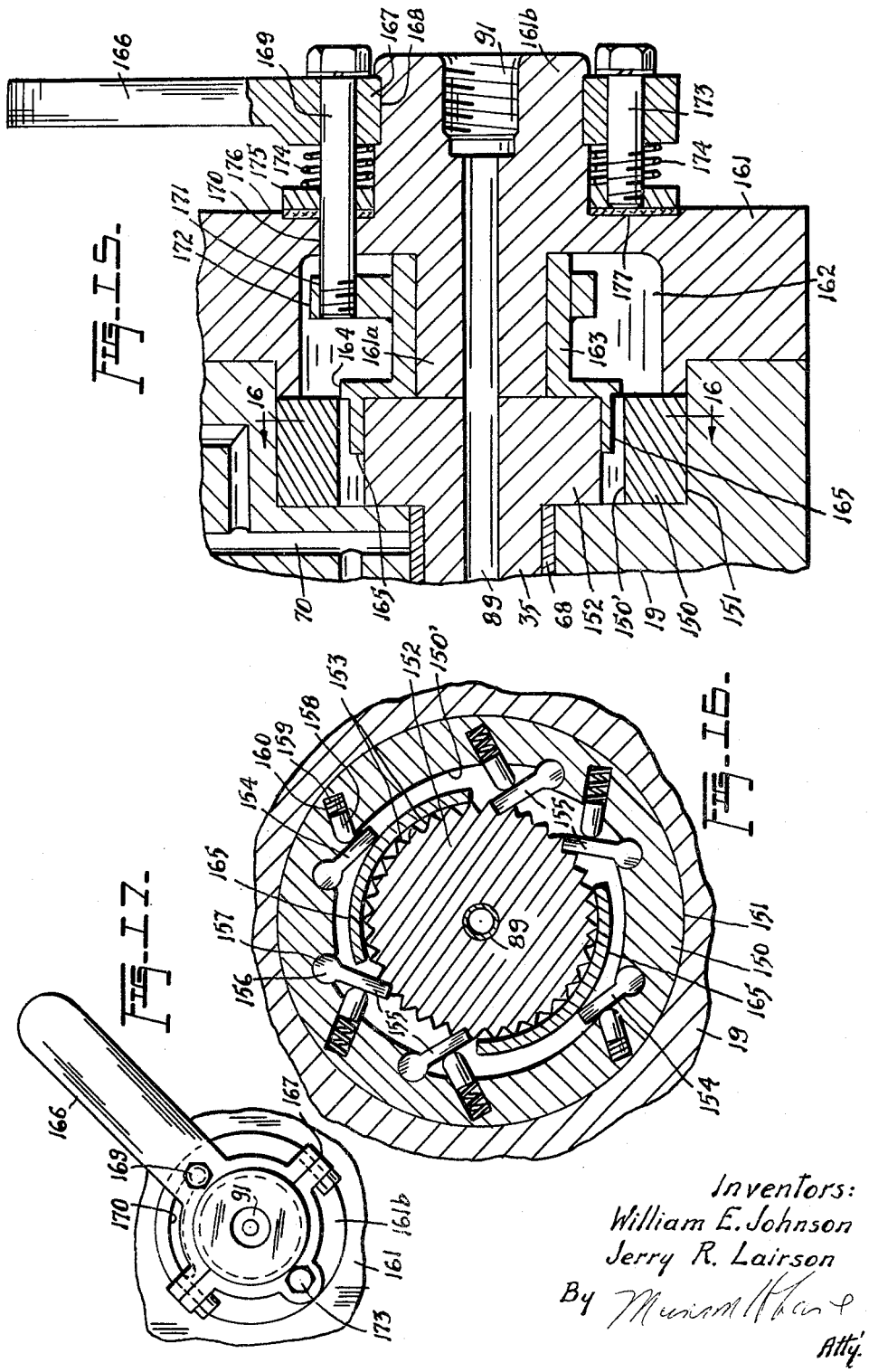

United States Patent Office 3,183,668
Patented May 18, 1965

3,183,668
PERCUSSION TYPE ROCK DRILLS
William E. Johnson and Jerry R. Lairson, St. Petersburg, Fla., assignors to Hydra-Might Company, St. Petersburg, Fla.
Filed Nov. 30, 1959, Ser. No. 856,080
14 Claims. (Cl. 60—51)

This application is a continuation-in-part of our application Serial No. 789,633, filed January 28, 1959, now abandoned.

This invention relates to new and useful improvements in percussion type rock drills, and the principal object of the invention is to provide an improved drill of this type which is hydraulically rather than pneumatically actuated.

As such, the hydraulically actuated drill in accordance with the invention is much more quiet in operation than a pneumatic drill, this noise reducing feature being of particular importance when the drill is used in tunnels or other underground locations. Moreover, the hydraulically actuated drill eliminates the high cost of a large air compressor such as is necessary with pneumatic drills, and may be made as a self-contained, self-propelled unit capable of working in any desired area, thus eliminating the necessity of transporting a pneumatic drill and its compressor as separate entities.

The hydraulic drill in accordance with the invention includes a combined piston and hammer reciprocable in a cylinder by hydraulic pressure so as to impact against a drill rod at the end of its downstroke, means being provided for rotating the piston and hammer during reciprocation as well as means for discharging air therethrough to blow broken pieces of rock out of the drill hole.

An important feature of the invention resides in the provision of an improved accumulator for smoothing out the flow of oil to the piston from a hydraulic pump used with the drill, the accumulator receiving oil under pressure during the upstroke of the piston and subsequently utilizing the accumulated oil pressure to speed the piston on the downstroke, whereby a more effective impact of the piston and hammer against the drill rod is attained. Another important feature in this connection resides in the provision of a pressure booster for charging the oil accumulator with air and thus affording a resilient cushion for the oil.

Another important feature of the invention resides in the provision of improved means for reversing the rotation of the drill when desired, either by remote control from the work station of the operator or manually at the drill.

Some of the advantages of the invention reside in its relatively simple construction, in its efficient and dependable operation, and in its adaptability to convenient manufacture.

With the foregoing objects and features in view and such other objects and features as may become apparent as this specification proceeds, the invention will be understood from the following description taken in conjunction with the accompanying drawings, wherein like characters of reference are used to designate like parts, and wherein for illustrative purposes:

FIGURE 1 is a side elevational view of the hydraulically actuated percussion type rock drill in accordance with the invention;

FIGURES 2A, 2B and 2C are fragmentary longitudinal sectional views on an enlarged scale showing, respectively, the lower, intermediate and upper end portions of the drill;

FIGURE 3 is a cross-sectional view, taken substantially in the plane of the line 3—3 in FIGURE 2C;

FIGURE 4 is a fragmentary sectional detail, taken substantially in the plane of the line 4—4 in FIGURE 3 but on an enlarged scale;

FIGURE 6 is a cross-sectional view, taken substantially in the plane of the line 6—6 in FIGURE 2B;

FIGURE 7 is a fragmentary sectional detail on an enlarged scale, taken substantially in the plane of the line 7—7 in FIGURE 6;

FIGURE 10 is a diagrammatic illustration of the pressure booster used in the invention;

FIGURE 11 is a fragmentary cross-sectional view, similar to the upper portion of FIGURE 6 but illustrating a modified arrangement of the valve;

FIGURE 12 is a fragmentary elevational view, taken in the direction of the arrow 12 in FIGURE 11;

FIGURE 13 is a fragmentary sectional view, taken substantially in the plane of the line 13—13 in FIGURE 11;

FIGURE 14 is a fragmentary sectional view, taken substantially in the plane of the line 14—14 in FIGURE 11;

FIGURE 15 is a fragmentary longitudinal sectional view, similar to the right hand portion of FIGURE 2B but illustrating a manually controlled reversing mechanism;

FIGURE 16 is a fragmentary sectional view, taken substantially in the plane of the line 16—16 in FIGURE 15; and FIGURE 17 is a fragmentary elevational detail on a reduced scale, showing the arrangement of the manual reversing lever.

General construction

Figure 8:
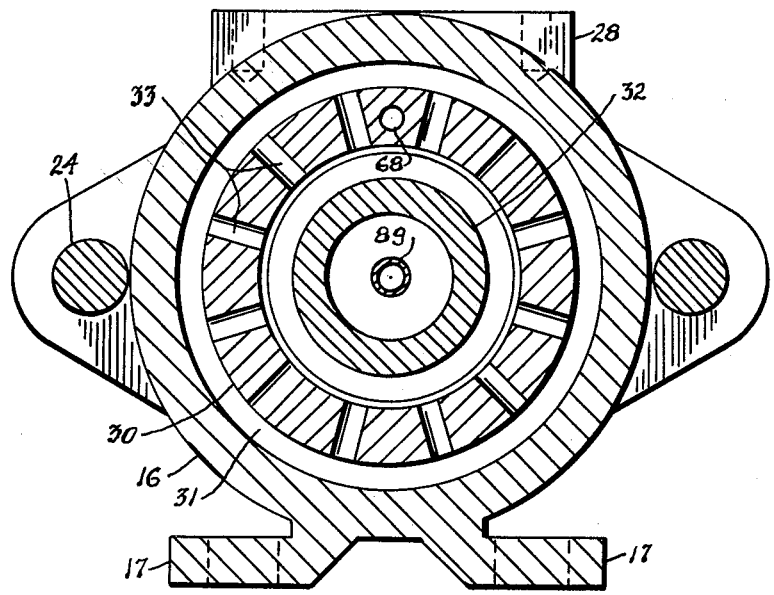
FIGURE 8 is a cross-sectional view, taken substantially in the plane of the line 8—8 in FIGURE 2A.
Figures 5, 9:
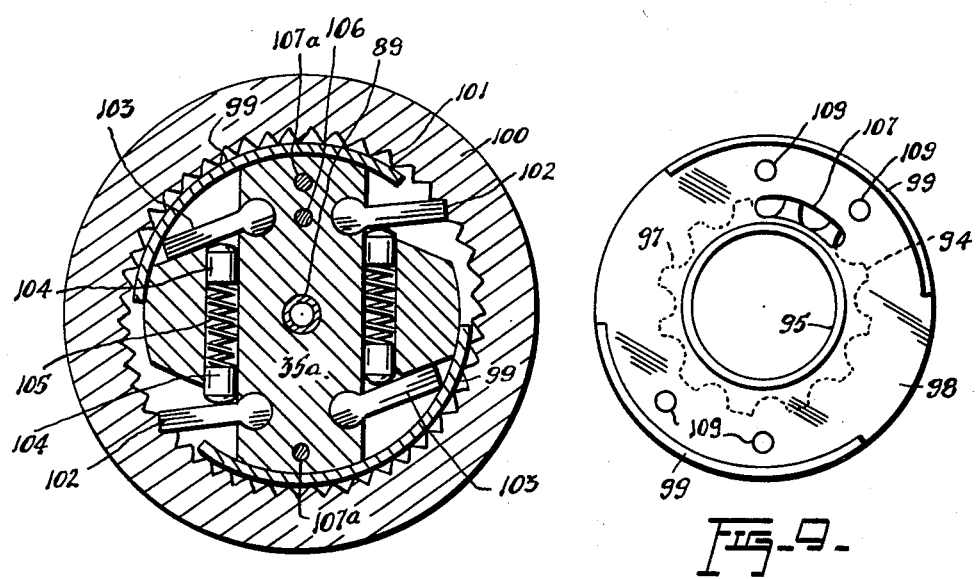
FIGURE 5 is a fragmentary cross-sectional view, taken substantially in the plane of the line 5—5 in FIGURE 2B.
FIGURE 9 is an end view of one of the components shown in FIGURES 2C, 3 and 5.

Referring now to the accompanying drawings in detail, the hydraulically actuated percussion type rock drill in accordance with the invention is designated generally by the reference numeral 15 and embodies in its construction an elongated body 16 provided, as is best shown in FIGURE 8, with longitudinally extending mounting flanges 17 and formed with a cylindrical bore. An enlarged extension 19 is provided at the head end of the body 16 and carries a valve block 20 which is secured thereto by suitable bolts 21. The body extension 19 is also equipped with an end cap 22, while a cap member 23 is provided at the other end of the body 16, the components 16, 19, 22 and 23 being rigidly secured together by a pair of longitudinally extending tie rods 24. A cylindrical oil accumulator 25 extends parallel to the body 16 and has one end thereof connected to the valve block 20, while its other end is provided with a cap 26 which is secured by bolts 27 to a saddle 28 on the body 16. Tie rods 29 passing through the cap 26 extend alongside the accumulator 25 and secure the same to the block 20.

The cylinder 18 of the body 16 is provided with a liner 30 which is relieved at the exterior thereof to provide an annular oil passage 31 between the cylinder and the liner. A combined hammer and piston 32 is reciprocable in the liner 30, the piston portion thereof having annular upper and lower surfaces 32a, 32b, respectively, as shown in FIGURE 2B. It will be apparent from the foregoing that when oil under pressure is admitted into the liner 30 at the upper end of the hammer and piston, its pressure against the surface 32a will drive the piston downwardly or to the left as shown in FIGURE 2A. Conversely, when oil is admitted to the lower end of the piston, its pressure against the surface 32b will drive the piston upwardly, or to the right. Flow of oil from the passage 31 to the lower end of the piston is facilitated by a set of radial ports 33 formed in the liner, as illustrated in FIGURE 8. The lower or hammer end portion 32c of the combined hammer and piston 32 is adapted to impact against the drill rod 34 which is slidable in and projects outwardly from the cap member 23. The piston portion of the hammer and piston 32 is formed with an axial bore accommodating a rifle bar 35 which is non-slidable but rotatable relative to the piston. A rifle bar nut 36, provided in the piston 32 engages splines 37 formed in the rifle bar 35, while splines 38 formed in the hammer portion 32c are engaged by a nut 39 which is secured in a sleeve 40 mounted in the cap member 23 and in an insert 41 in the body 16, as shown in FIGURE 2A. The sleeve 40 also carries a bushing 42 for the aforementioned drill rod 34.

Although for convenience of illustration the splines 37, 38 have been shown as straight or longitudinally extending, actually they are of a spiral form, extending spirally along the rifle bar 35 and the piston portion 32c, respectively. Thus, when the combined hammer and piston 32 is reciprocated, a rotary movement will be imparted thereto by the engagement of the nuts 36, 39 with the respective splines.

Control valve

The valve block 20 is provided with a transverse valve chamber 43 (FIG. 6) accommodating a reciprocable valve rod 44 having a pair of enlarged valve members or heads 45 of a spool valve, which heads close a pair of valve ports 46, 47 when the rod 44 is at the center of its reciprocating travel. The ports 46, 47 communicate with a pair of oil passages 48, 49, respectively, formed in the body extension 19, it being noted that the extension 19 is provided with two sets of bores 50, 51 as is best shown in FIGURE 6. The bores 50 establish communication between the oil passage 48 and the inside of the liner 30 at the top 32a of the piston 32, so that when the valve rod 44 is slid to the left to uncover the port 46, oil may be delivered to the piston for sliding the same downwardly. The bores 51, on the other hand, establish communication between the oil passages 49 and the aforementioned passage 31, so that when the rod 44 is slid to the right to uncover the port 47, oil is delivered from the passage 31 through the ports 33 to the lower surface 32b of the piston for sliding the same upwardly.

Sliding of the valve rod 44 is effected by oil pressure from the cylinder in response to the movement of the piston, the liner 30 and extension 19 being provided with aligned portions of a longitudinal passage 52 which terminates in a port 53 at the inside of the liner below the lower end 32b of the piston when the latter is slid upwardly, but which is covered by the piston as it slides downwardly. Another, similar passage 54 is provided in the liner 30 and extension 19, terminating in a port 55 at the inside of the liner above the upper end 32a of the piston when the latter is slid downwardly, but which is covered by the piston as it slides upwardly. Thus, when the valve port 46 is open and oil flows from the chamber 43 through the passages 48 and 50 to the top 32a of the piston and the latter is thereby caused to travel downwardly, it will close off the port 53 and eventually open the port 55, whereupon oil will pass through the passage 54 which communicates with a passage 56 in the valve block 20 and leads to a closure cap 58 in the lefthand side of the block 20 where the oil under pressure will act against the adjacent end of the rod 44 and slide the latter to the right. This action will result in the closing of the port 46 and opening of the port 47, permitting oil to travel from the chamber 43 through the passages 49, 51, 31 and 33 to the lower end 32b of the piston, thus causing the latter to slide upwardly. During upward travel of the piston the port 55 will become covered and the port 53 eventually uncovered, thus permitting oil to flow through the passage 52 which communicates with a passage 57 in the valve block 20 and leads to a closure cap 59 in the right hand side of the block 20 where the oil under pressure will act against the adjacent end of the rod 44 and slide the latter to the left, thus closing the port 47 and again opening the port 46 for the next cycle of operation. It is to be noted that the location of the ports 53, 55 is such that downstroke pressure is maintained on the piston until and for a short time after the hammer has made contact with the drill rod 34, thus producing a follow up or a pushing blow which overcomes the inertia of the drill rod and results in a fast drilling speed of the machine.

As shown in FIGURES 6 and 7, the aforementioned closure caps 58, 59 are identical in construction, each having a central oil chamber 60 to slidably receive an end of the rod 44 and including a cap screw 61 with passages 62 which communicate the chamber 60 with passages 63 in the closure cap, the passages 63 of the cap 58 communicating with the passage 56 and those of the cap 59 with the passage 57.

Suitable sealing rings 64, 65 are provided between the liner 30 and the combined hammer and piston 32 and additional sealing rings 66 are provided between the piston and a tubular guide member 67 which is formed integrally with the body extension 19 and projects into the piston as shown in FIGURE 2B, the rifle bar 35 being rotatably journalled in a bushing 68 in the member 67. Any oil between the rings 64, 65 may enter a drain passage 69 extending longitudinally in the liner 30 and flow through a passage 70 in the extension 19 to lubricate the bushing 68 and may also flow through the passage 70 into a chamber 71 in the block 20 which communicates with the low pressure or return sides 72 of the control valve. The closure caps 58, 59 are also provided with drain passages 73 extending from the chambers 60 to the chambers 72, for discharging oil from the chambers 60 when the rod 44 is slid from either end to the other. It may be also noted that suitable packing rings or gaskets 74 are provided between the various components of the assembly to prevent leakage.

The arrangement of the valve members 45, relative to the ports 46 and 47, is such that when the rod 44 is slid in either direction, oil under pressure is delivered from the chamber 43 through one port to the cylinder and simultaneously returned from the cylinder through the other port into the return side 72 of the valve, from where the oil is recirculated through the oil pump which has its inlet connected by a line 75 to the aforementioned chamber 71.

Accumulator

The accumulator 25 includes an adapter 76 which communicates the interior of the accumulator with the valve chamber 43 and also has a lateral opening 77 through which oil under pressure from the pump is admitted into the chamber 43 and into the accumulator. A floating piston 78 is freely slidable in the accumulator and the latter is provided adjacent the adapter 76 with a valve port 80 which is closed by the piston when the latter comes in contact therewith. The piston 78 is equipped with suitable rings 79 and the portion of the accumulator between the piston 78 and the end cap 26 is adapted to be filled by air under pressure from a small air compressor 81.

Apart from the oil pump 82 shown in FIGURE 10, the drill is intended to be used in association with a pressure booster 83 which, as shown diagrammatically in FIGURE 10, comprises an elongated housing having a double-ended piston 84 slidable therein, one end of the housing communicating with the oil pressure line 85 which extends from the pump 82 to the opening 77 of the accumulator, while the opposite end of the housing communicates with a line 86 which extends from the air compressor 81 to an air inlet passage 87 in the accumulator end cap 26.

Suitable check valves 88 are provided in the line 86 before and after the booster 83 and it will be noted from the foregoing that when the apparatus is in operation, oil will be stored in the accumulator 25 between the piston 78 and the adapter 76 while the drill piston 32 is at the ends of its stroke. The upstroke actuating area 32b of the piston 32 is smaller than the downstroke actuating area 32a, and since on the upstroke the weight and inertia of the piston 32 does not permit the full volume of discharge from the pump 82 to enter the drill cylinder, a storage of oil in the accumulator will result. The pressure of the stored oil in the accumulator is then utilized to speed the downstroke of the piston 32, more so than the piston would be driven by pump pressure alone, thus producing an effective impact of the combined piston and hammer against the drill rod 34.

The oil end 84a of the pressure booster piston 84 is smaller than the air end 84b, so that the air passing through the line 86 to the accumulator is at a lesser pressure (approximately 75%) than the oil pressure in the line 85. The column of air in the accumulator 25, between the floating piston 78 and the end cap 26 provides a degree of resiliency and a resultant cushioning action for the pressured oil. When the machine is not in operation, closure of the valve port 80 by the piston 78 prevents possible escape of air from the accumulator into the drill.

For the purpose of blowing broken and loose rock out of the drill hole, an air tube 89 extends axially through the end cap 22 and through the rifle bar 35 and combined hammer and piston 32 into an axial bore 90 in the drill rod 34. The cap 22 is provided with a screw-threaded bore 91 in FIG. 2C in communication with the tube 89, into which bore a fitting (not shown) may be inserted for connection to one end of a suitable line from the air compressor 81.

*Reversing mechanism*

The mechanism for reversing the rotation of the combined hammer and piston 32 will now be described with reference to FIGURES 2B, 2C, 3, 4, 5 and 9, it being apparent that, as already noted, reciprocation of the member 32 is accompanied by its rotation in one direction on the downstroke and in opposite direction on the upstroke, as caused by the engagement of the nuts 36 and 39 with the respective spiral splines 37 and 38. However, the rifle bar 35 having the splines 37 is itself rotatable in the bushing 68, so that if it is held against rotation in one direction and permitted to rotate in the other, an intermittent rotary movement in one direction would be imparted to the piston and hammer 32. Moreover, if the holding action of the rifle bar were reversed as to direction of rotation, the direction of rotation of the combined piston and hammer 32 would be reversed correspondingly.

Thus, the invention provides an annular member 94 (FIGS. 2B and 2C) having a bushing 95 therein which is rotatably mounted on a tubular portion 96 of the end cap 22, the member 94 having a toothed periphery as shown at 97 (FIG. 3). The member 94 is also provided with a circular flange plate 98 having a pair of diametrically opposed, arcuate flanges 99 (FIG. 5) which are disposed in a recess formed by a ring 100. The ring 100 is provided at its inner edge with a set of ratchet teeth 101 which are engageable, selectively, by two pairs of pawls 102, 103. These pawls are pivotally mounted in an enlarged end portion 35a of the rifle bar 35, the portion 35a being disposed within the arcuate flanges 99 of the plate 98. The pawls 102, 103 are normally urged outwardly by pairs of followers 104 which are slidable in the rifle bar portion 35a, a compression spring 105 being interposed between the followers in each pair to urge the same apart. The rifle bar portion 35a carries a pin 106 which is movable in an arcuate slot 107 formed in the flange plate 98, whereby to limit the extent of rotation of the plate relative to the rifle bar. Also, a pair of spring-pressed detents 107a are carried by the rifle bar portion 35a and are selectively receivable in pairs of notches or keeper seats 109 formed in the plate 98 for releasably retaining the flange plate 98 in either one of its two positions relative to the rifle bar, as limited by the extent of movement of the pin 106 in the slot 107. When the pin 106 is at one end of the slot 107, the pawls 102 are projected outwardly through the spaces between the arcuate flanges 99 into engagement with the ratchet teeth 101 of the ring 100, while the pawls 103 are sustained out of engagement with the ratchet teeth by the flanges, as will be apparent from FIGURE 5. In this position, the rifle bar portion 35a will be permitted to rotate in a counter-clockwise direction with the pawls 102 skipping over the ratchet teeth of the stationary ring 100, but clockwise rotation of the rifle bar will be prevented. On the other hand, when the plate 98 is rotated relative to the rifle bar so that the pin 106 is at the opposite end of the slot 107, the pawls 102 will be kept out of engagement with the ratchet teeth but the pawls 103 will engage the same, thus permitting rotation of the rifle bar in the clockwise direction and preventing counter-clockwise rotation of the same. Accordingly, by simply turning the plate 98 relative to the rifle bar within the limits of travel of the pin 106 in the slot 107, the direction in which the rifle bar is permitted to rotate may be reversed, thus also reversing the direction of the intermittently rotating hammer and piston 32.

The adjustment of the plate 98 with respect to the rifle bar for purposes of direction reversing is effected by a pair of air cylinders 108 which are mounted in substantially opposing relation in the end cap 22 as shown in FIGURE 3, each cylinder including a piston 109 having a piston rod 110 which is operatively engageable with the toothed periphery 97 of the member 94 so that when air under pressure is admitted into the cylinder, the piston will be forced outwardly and its rod 110 will engage the teeth 97 to impart partial rotation to the member 94 and the associated plate 98. The piston 109 is retracted into the cylinder 108 by a suitable compression spring 111 when air is permitted to exhaust from the cylinder, and since the stroke of the piston is relatively small, only sufficient to advance the member 94 by a distance of one of the teeth 97 in a single actuation of the cylinder, the cylinder may be actuated several times in succession in order to rotate the plate 98 within the limits of travel of the pin 106 in the slot 107. The cylinder 108 is pivotally mounted on a pin 112 in the cap 22 and body extension 19 is shown in FIGURE 4, so that the cylinder may rock somewhat and facilitate skipping of the piston rod 110 from one of the teeth 97 to the next. A suitable leaf spring 113 is provided in the cap 22 for urging the cylinder toward the member 94, as will be readily apparent.

The two cylinders 108 act in opposite directions so that they may be employed selectively to turn the member 94 in one direction or the other. Thus, by energizing one cylinder and leaving the other inactive, the member 94 may be rotated in one direction, and vice versa.

The pins 112 of the cylinders 108 are provided with air passages 114, best shown in FIGURE 4, communicating with further passages 115 in the body extension 19, whereby air under pressure may be admitted into the cylinders. For this purpose, the passages 115 are connected by suitable lines to a suitable manually operated valve (not shown) for selectively energizing the cylinders, such a valve receiving its supply of compressed air from the aforementioned compressor 81.

*Modification of control valve*

Referring now to the modified embodiment of the spool valve illustrated in FIGURES 11–14, the same is similar to a substantial extent to the valve shown in FIGURE 6 but possesses several additional structural features whereby the operation of the entire drill is considerably improved. As such, the modified valve comprises a valve cylinder block 125 similar to the valve block of the previously described embodiment, which block is secured to the extension 19 at the head end of the drill body by suitable bolts 21. The block 125 is provided therein with a transverse valve chamber 126 accommodating a reciprocable valve rod 127, the latter being provided with a pair of enlarged spool valve members or heads 128 which close the valve ports 46, 47 when the rod 127 is at the center of its reciprocating travel. The sliding or reciprocation of the rod 127 is effected by oil pressure from the drill cylinder in response to the movement of the piston therein, as in the valve embodiment of FIGURE 6, so that a further description thereof at this point is deemed unnecessary.

However, it is to be noted that the block 125 is provided with adjustable closure plugs 129 disposed in the ends of the chamber 126, the plugs 129 having flanges 129a provided with attachment screws 130 and locking screws 131. The screws 130 are threaded into the block 125 while the screws 131 abut the block, so that when the screws 130 are tightened, the plugs 129 are drawn into the chamber 126 and may be locked in selected positions by tightening the screws 131 which produce a tendency to slide the plugs outwardly. The plugs 129 are provided with axial bores 132 which slidably receive the end portions of the valve rod 127 and the inner ends 129b of the plugs 129 are engageable by collars 133 provided on the rod 127, whereby to provide stop means for limiting the extent of sliding movement of the rod. Inasmuch as the length of travel of the rod 127 governs the length of the piston-hammer travel and the position of the rod similarly governs the position of the piston-hammer, it is desirable to control the travel of the valve rod 127 within thousandths of an inch limits, which is facilitated by the adjustment provided by the screws 130, 131, as will be readily understood. The collars 133, engageable with the inner surfaces 129b of the plugs 129 provides positive stops for the valve rod 127, and another feature of this embodiment of the valve is the provision of very shallow, circular recesses 134 in the surfaces 129b of the plugs 129 which are engaged by the collars 133. These recesses, being approximately .10″ deep, contain a film of oil which prevents a metal-to-metal contact between the plugs 129 and the collars 133. While this is not a dash-pot arrangement, it affords full speed of valve rod travel to within a few thousandths of an inch of stops, so that the parts do not become bruised by metal-to-metal contact and a quieter operation of the valve results.

The bore 132 of each of the plugs 129 opens into an oil chamber 132a having a screw-threaded outer portion 132b accommodating a cap screw 135 having a gasket 136 under its head in abutment with the outer surface of the plug, the inner end portion of the cap screw being provided with an axial passage 137 and with a plurality of radial passages 138 which, as is best shown in FIGURE 13, communicate with an annular channel formed, as indicated at 139, by opposing grooves in the outer surface of the cap screw 135 and in the chamber 132a of the plug 129. The channel 139, in turn, communicates through the medium of radial passages 140 in the plug 129 with an annular groove 141 formed in the block 125, the groove 141 being communicated, as indicated at 142, with the passage 57 leading to the drill cylinder as already described. The inner end of the cap screw 135 is provided with a tubular extension 143 which enters freely into a hollow end 144 of the valve rod 127 while communicating with the passage 137, as shown. Radial passages 145 and longitudinal passages 146 communicate the chamber 132a with the adjacent low pressure or return side 147 of the valve. The tubular extensions 143 of the cap screws 135 deliver oil from the passage 57 into the hollow ends 144 of the valve rod 127 with what may be called a jet action, whereby a more positive actuation of the valve rod is obtained while still facilitating exit of the oil from the hollow ends of the valve rod through the chambers 132a and passages 145, 146 to the return sides 147 of the valve.

As shown in FIGURES 11 and 14, the valve head members 128 are provided at both sides thereof with relatively shallow cut-outs or recesses 149. Should the valve rod 127 stop on exact center, oil would pass into the downstroke and upstroke cylinders at the same time and with the piston-hammer stopping with both actuating ports closed, the downstroke piston, having a larger area than the upstroke piston, would force the piston-hammer downwardly, the oil in the smaller cylinder being forced out into the return or exhaust until the valve actuating port for upstroke were uncovered, whereupon normal operation of the drill would commence. Thus, by provision of the recesses 149, the piston-hammer always starts as soon as oil is admitted to the drill, the shock of completely stopping the oil flow is reduced, and oil is allowed to pass to either or both the upstroke and downstroke pistons through the ports 46, 47 when starting from the exact center position of the valve rod 127.

*Modified form of reversing mechanism*

Referring now to the modified form of the reversing mechanism shown in FIGURES 15–17, the same is of a manually actuated type and may be utilized in place of the remotely controlled reversing mechanism illustrated in FIGURES 2C, 3, 4, 5 and 9. As such, the manual reversing mechanism embodies in its construction an annulus 150 fitted in a recess 151 in the extension 19 concentrically with the air tube 89 and with a circular head 152 provided on the rifle bar 35. The periphery of the head 152 is spaced from the inner edge 150′ of the annulus 150 and is provided with a set of teeth 153 which are engageable by sets of ratchet pawls 154, 155 having enlarged, rounded end portions 156 movably mounted in recesses 157 in the annulus 150 so that the pawls may be pivotally moved in and out of operative engagement with the teeth 153. The pawls are urged into engagement with the teeth by followers 158 and compression springs 159 seated in sockets 160 provided in the annulus 150 as shown, it being noted that the pawls 154 are oriented to operatively engage the teeth 153 in one direction of rotation of the rifle bar 35, while the pawls are oriented to act in the relatively opposite direction of rotation of the bar.

The end cap 161, secured to the extension 19, is provided with a chamber 162 accommodating a re-entrant end cap portion 161a on which is rotatably positioned an annular member 163, similar to the aforementioned member 94. The member 163 is equipped with a flanged end plate 164 which, in turn, carries a pair of arcuate flanges 165, projecting into the space between the peripheral teeth 153 of the head 152 and the inner edge 150′ of the annulus 150. Thus, when the mechanism is in the position shown in FIGURE 16, the flanges 165 keep the pawls 154 out of engagement with the teeth 153 while permitting the pawls 155 to engage the teeth, so that rotation of the rifle bar is facilitated in a counter-clockwise direction as viewed in FIGURE 16. However, when the member 163 is partially rotated on the cap portion 161a so that the pawls 155 are disengaged from the teeth 153 and the pawls 154 permitted to engage the teeth, rotation of the rifle bar in the clockwise direction will be facilitated.

The required adjustment of the annular member 163 is effected by a manually operated handle 166 having a split bearing portion 167 rotatably seated in an annular groove 168 formed in the projecting portion 161b of the end cap 161, the handle being equipped with a bolt 169 which extends through an arcuate slot 170 in the cap 161 into the chamber 162 and is secured at its inner end in a screw-threaded bore 171 provided in a lug 172 welded or otherwise fastened to the member 163. Accordingly, it will be apparent that by simply turning the handle 166, the member 163 will be turned on the cap portion 161a so as to selectively engage and disengage the pawls 154, 155 with and from the teeth 153, as already described, to correspondingly reverse the rotation of the drill. The slot 170 serves to restrict the extent of movement of the bolt 169 and associated parts so that when the bolt is at one end of the slot the rifle bar is rotated in one direction and when the bolt is in the other end of the slot the rifle bar is rotated in the opposite direction, it being also noted that when the handle 166 is positioned so that the bolt is at the center of the slot, the flanges 165 will engage all the pawls 154, 155 so that they are out of engagement with the teeth 153 and no rotation of the rifle bar results.

Means are provided for frictionally retaining the handle 166 in a selected position, these means involving the provision of another bolt 173 disposed diametrically opposite to the bolt 169, and the provision of compression springs 174 on the bolts 169, 173, which springs are interposed between the handle 166, that is, between the bearing portion 167 of the handle and a pressure ring 175 which bears against an annular washer or pad 176 of felt or similar material, provided in an annular seat 177 in the cap 161. As will be apparent, the frictional engagement of the ring 175 with the pad 176 is such as to sustain the handle 166 in a preadjusted position as long as required, until the handle is manually moved.

It will be understood from the foregoing that the invention provides a hydraulically actuated percussion type rock drill which, as compared to pneumatic drills, is more quiet and efficient in operation and does not require a large air compressor for its actuation. Moreover, the hydraulic drill in accordance with the invention employs an oil accumulator to assure a smooth flow of oil from the pump to the drill and furnish an additional amount of oil pressure for speeding the piston of the drill on its downstroke, which is not attained in drills of conventional type.

While in the foregoing there have been shown and described the preferred embodiments of the invention, various modifications may become apparent to those skilled in the art to which the invention relates. Accordingly, it is not desired to limit the invention to the foregoing disclosure, and various modifications may be resorted to, such as may lie within the spirit and scope of the appended claims.

What is claimed as new is:

1. In a hydraulic percussion type rock drill, the combination of an elongated body having a power cylinder therein, a hammer and piston member reciprocable in said power cylinder and adapted to impact against a drill rod at one end of said body, valve means for directing liquid under pressure into said power cylinder for reciprocating said member, said valve means comprising a valve body including a cylindrical valve chamber having a pair of outlet ports communicating respectively with said power cylinder on opposite sides of said piston member, a spool valve reciprocating in said valve chamber and comprising a valve rod, a pair of valve members mounted on said rod intermediate its ends and coacting with the respective ports, closure plugs for the ends of said valve chamber each having an axial recess to snugly receive one end of the valve rod, and means responsive to the reciprocation of said piston member for actuating said valve means, said means comprising a pair of inlet jets formed in the end plugs of the valve chamber and communicating with said spool valve on opposite sides of said piston member.

2. In a hydraulic percussion type rock drill, the combination of an elongated body having a power cylinder therein, a hammer and piston member reciprocable in said power cylinder and adapted to impact against a drill rod at one end of said body, valve means for directing liquid under pressure into said power cylinder for reciprocating said member, said valve means comprising a valve body including a cylindrical valve chamber having a pair of outlet ports communicating respectively with said power cylinder on opposite sides of said piston member, a spool valve reciprocating in said valve chamber and comprising a valve rod, a pair of valve members mounted on said rod intermediate its ends and coacting with the respective ports, closure plugs for the ends of said valve chamber each having an axial recess to snugly receive one end of the valve rod, and means responsive to the reciprocation of said piston member for actuating said valve means, said means comprising a pair of inlet jets formed in the end plugs of the valve chamber and communicating with said spool valve on opposite sides of said piston member, together with stop means for limiting the extent of reciprocation of said valve rod.

3. In a hydraulic percussion type rock drill, the combination of an elongated body having a power cylinder therein, a hammer and piston member reciprocable in said power cylinder and adapted to impact against a drill rod at one end of said body, valve means for directing liquid under pressure into said power cylinder for reciprocating said member, said valve means comprising a valve body including a cylindrical valve chamber having a pair of outlet ports communicating respectively with said power cylinder on opposite sides of said piston member, a spool valve reciprocating in said valve chamber and comprising a valve rod, a pair of valve members mounted on said rod intermediate its ends and coacting with the respective ports, closure plugs for the ends of said valve chamber each having an axial recess to snugly receive one end of the valve rod, and means responsive to the reciprocation of said piston member for actuating said valve means, said means comprising a pair of inlet jets formed in the end plugs of the valve chamber and communicating with said spool valve on opposite sides of said piston member, together with stop means for limiting the extent of reciprocation of said valve rod, said stop means being micrometrically adjustable.

4. In a hydraulic percussion type rock drill, the combination of an elongated body having a power cylinder therein, a hammer and piston member reciprocable in said power cylinder and adapted to impact against a drill rod at one end of said body, valve means for directing liquid under pressure into said power cylinder for reciprocating said member, said valve means comprising a valve body including a cylindrical valve chamber having a pair of outlet ports communicating respectively with said power cylinder on opposite sides of said piston member, a spool valve reciprocating in said valve chamber and comprising a valve rod, a pair of valve members mounted on said rod intermediate its ends and coacting with the respective ports, closure plugs for the ends of said valve chamber each having an axial recess to snugly receive one end of the valve rod, and means responsive to the reciprocation of said piston member for actuating said valve means, said means comprising a pair of inlet jets formed in the end plugs of the valve chamber and communicating with said spool valve on opposite sides of said piston member, together with stop means for limiting the extent of reciprocation of said valve rod, said stop means including collars carried on the ends of said rod beyond said valve members.

5. In a hydraulic percussion type rock drill, the combination of an elongated body having a power cylinder therein, a hammer and piston member reciprocable in said power cylinder and adapted to impact against a drill rod at one end of said body, valve means for directing liquid under pressure into said power cylinder for reciprocating said member, said valve means comprising a valve body including a cylindrical valve chamber having a pair of outlet ports communicating respectively with said power cylinder on opposite sides of said piston member, a spool valve reciprocating in said valve chamber and comprising a valve rod, a pair of valve members mounted on said rod intermediate its ends and coacting with the respective ports, closure plugs for the ends of said valve chamber each having an axial recess to snugly receive one end of the valve rod, and means responsive to the reciprocation of said piston member for actuating said valve means, said means comprising a pair of inlet jets formed in the end plugs of the valve chamber and communicating with said spool valve on opposite sides of said piston member, together with stop means for limiting the extent of reciprocation of said valve rod, said stop means including collars carried on the ends of said rod beyond said valve members and coacting with said end plugs.

6. In a hydraulic percussion type rock drill, the combination of an elongated body having a power cylinder therein, a hammer and piston member reciprocable in said power cylinder and adapted to impact against a drill rod at one end of said body, valve means for directing liquid under pressure into said power cylinder for reciprocating said member, said valve means comprising a valve body including a cylindrical valve chamber having a pair of outlet ports communicating respectively with said power cylinder on opposite sides of said piston member, a spool valve reciprocating in said valve chamber and comprising a valve rod, a pair of valve members mounted in said rod intermediate its ends and coacting with the respective ports, closure plugs for the ends of said valve chamber each having an axial recess to snugly receive one end of the valve rod, and means responsive to reciprocation of said piston member for actuating said valve means, said means comprising a pair of inlet jets formed in the end plugs of the valve chamber and communicating with said spool valve on opposite sides of said piston member, together with stop means for limiting the extent of reciprocation of said valve rod, said stop means including collars carried on the ends of said rod beyond said valve members and coacting with said end plugs, said end plugs being axially adjustable.

7. In a hydraulic percussion type rock drill, the combination of an elongated body having a power cylinder therein, a hammer and piston member reciprocable in said power cylinder and adapted to impact against a drill rod at one end of said body, valve means for directing liquid under pressure into said power cylinder for reciprocating said member, said valve means comprising a valve body including a cylindrical valve chamber having a pair of outlet ports communicating respectively with said power cylinder on opposite sides of said piston member, a spool valve reciprocating in said valve chamber and comprising a valve rod, a pair of valve members mounted on said rod intermediate its ends and coacting with the respective ports, closure plugs for the ends of said valve chamber each having an axial recess to snugly receive one end of the valve rod, and means responsive to reciprocation of said piston member for actuating said valve means, said means comprising a pair of inlet jets formed in the end plugs of the valve chamber and communicating with said spool valve on opposite sides of said piston member, together with stop means for limiting the extent of reciprocation of said valve rod, said stop means including collars carried on the ends of said rod beyond said valve members and coacting with said end plugs, said end plugs having circular recesses at the inner ends thereof corresponding in size to said collars, and serving to prevent metal to metal contact at the end of each stroke.

8. In a hydraulic percussion type rock drill, the combination of an elongated body having a cylinder therein, a combined hammer and piston member reciprocable in said cylinder and adapted to impact against a drill rod at one end of said body, means for directing liquid under pressure into said cylinder for reciprocating said member, means for rotating said member in one direction during its reciprocation, and means for reversing the direction of rotation of said member together with control means for said last mentioned means, said control means comprising a manually operated element movably mounted on said body and means operatively connecting said element to said direction of rotation reversing means, said body having a reduced projecting cylindrical portion at one end, and said manually operated element including a handle rotatably mounted on said reduced end portion, and means for frictionally retaining the handle in a selected position, including bolts carried by the handle and compression springs surrounding said bolts and reacting between said handle and the end of said body.

9. In a hydraulic percussion type rock drill, the combination of an elongated body having upper and lower ends and provided with a cylinder extending longitudinally therein, a combined hammer and piston member reciprocable in said cylinder and including an upper piston portion and a lower hammer portion adapted to impact against a drill rod at the lower end of said body at the end of the downstroke of said member, means for directing liquid under pressure into said cylinder alternately above and below said piston portion whereby to reciprocate said member, a non-slidable but rotatable rifle bar journalled in the upper end of said body and having said piston portion of said member slidable thereon, means provided in said piston portion and on said rifle bar for imparting rotation to said rifle bar alternately in opposite directions during the respective upstroke and downstroke movements of said member, reversible means for selectively permitting rotation of the rifle bar in one direction and preventing rotation thereof in the opposite direction whereby intermittent uni-directional rotation may be imparted to said hammer and piston member during its reciprocation, reversing means for said reversible means, and means for controlling said reversing means, said controlling means including a manually operated element mounted on said body, said reversing means including a ring rigid with said body, a pair of pawls carried by said ring, a toothed plate carried by said rifle bar concentrically mounted within said ring, pawl operating means comprising a pair of flanges interposed between said toothed plate and said ring and concentric with both, means connecting said flanges with said manually operated element, and means including coil springs interposed between the manually operated element and said body for frictionally retaining said manually operated element in a selected position.

10. In a hydraulic percussion type rock drill, the combination of an elongated body having upper and lower ends and provided with a cylinder extending longitudinally therein, a combined hammer and piston member reciprocable in said cylinder and including a hammer portion adapted to impact against a drill rod at the lower end of said body at the end of the downstroke of said member and a piston portion having an upper end wall of a relatively large area and a lower end wall of a relatively small area, valve means carried by said body for directing liquid under pressure into said cylinder alternately to the upper and lower end walls of said piston portion for reciprocating said member, an elongated accumulator carried by said body and having one end thereof in communication with said valve means whereby liquid under pressure may be received in said accumulator on the upstroke of said member and discharged on the downstroke to assist in propelling said member on the downstroke, a hydraulic pump for directing liquid under pressure to said accumulator and to said valve means, means for directing compressed air into the other end portion of the accumulator for resiliently cushioning the liquid therein, together with a pressure booster operatively connected to said accumulator, said pressure booster comprising an elongated housing having opposite end portions of different cross-sectional area, a double-ended piston freely slidable in said housing and having opposite ends of different cross-sectional area corresponding to the respective opposite end portions of said housing, one end of said housing communicating with said compressed air directing means and with the end of said accumulator having air therein and the other end of said housing communicating with said hydraulic pump and with the end of the accumulator having liquid therein.

11. In a hydraulic percussion type rock drill, the combination of an elongated body having upper and lower ends and provided with a cylinder extending longitudinally therein, a combined hammer and piston member reciprocable in said cylinder and including a hammer portion adapted to impact against a drill rod at the lower end of said body at the end of the downstroke of said member and a piston portion having an upper end wall of a relatively large area and a lower end wall of a relatively small area, valve means carried by said body for directing liquid under pressure into said cylinder alternately to the upper and lower end walls of said piston portion for reciprocating said member, an elongated accumulator carried by said body and having one end thereof in communication with said valve means whereby liquid under pressure may be received in said accumulator on the upstroke of said member and discharged on the downstroke to assist in propelling said member on the downstroke, a hydraulic pump for directing liquid under pressure to said accumulator and to said valve means, means for directing compressed air into the other end portion of the accumulator for resiliently cushioning the liquid therein, together with a pressure booster operatively connected to said accumulator, said pressure booster comprising an elongated housing having opposite end portions of different cross-sectional area, a double-ended piston freely slidable in said housing and having opposite ends of different cross-sectional area corresponding to the respective opposite end portions of said housing, one end of said housing communicating with said compressed air directing means and with the end of said accumulator having air therein and the other end of said housing communicating with said hydraulic pump and with the end of the accumulator having liquid therein, the end of said housing communicating with said compressed air directing means is of a relatively large cross-section and the end thereof communicating with said hydraulic pump is of a relatively small cross-section.

12. In a hydraulic percussion type rock drill, the combination of an elongated body having upper and lower ends and provided with a cylinder extending longitudinally therein, a combined hammer and piston member reciprocable in said cylinder and including a hammer portion adapted to impact against a drill rod at the lower end of said body at the end of the downstroke of said member and a piston portion having an upper end wall of a relatively large area and a lower end wall of a relatively small area, valve means carried by said body for directing liquid under pressure into said cylinder alternately to the upper and lower end walls of said piston portion for reciprocating said member, an elongated accumulator carried by said body and having one end thereof in communication with said valve means whereby liquid under pressure may be received in said accumulator on the upstroke of said member and discharged on the downstroke to assist in propelling said member on the downstroke, a hydraulic pump for directing liquid under pressure to said accumulator and to said valve means, means for directing compressed air into the other end portion of the accumulator for resiliently cushioning the liquid therein, together with a pressure booster operatively connected to said accumulator, said pressure booster comprising an elongated housing having opposite end portions of different cross-sectional area, a double-ended piston freely slidable in said housing and having opposite ends of different cross-sectional area corresponding to the respective opposite end portions of said housing, one end of said housing communicating with said compressed air directing means and with the end of said accumulator having air therein and the other end of said housing communicating with said hydraulic pump and with the end of the accumulator having liquid therein, together with a piston freely slideable in said accumulator and separating the liquid from the air therein.

13. In a hydraulic percussion type rock drill, the combination of an elongated body having upper and lower ends and provided with a cylinder extending longitudinally therein, a combined hammer and piston member reciprocable in said cylinder and including an upper piston portion and a lower hammer portion adapted to impact against a drill rod at the lower end of said body at the end of the downstroke of said member, means for directing liquid under pressure into said cylinder alternately above and below said piston portion whereby to reciprocate said member, a non-slidable but rotatable rifle bar journalled in the upper end of said body and having said piston portion of said member slidable thereon, means provided in said piston portion and on said rifle bar for imparting rotation to said rifle bar alternately in opposite directions during the respective upstroke and downstroke movements of said member, reversible means for selectively permitting rotation of the rifle bar in one direction and preventing rotation thereof in the opposite direction whereby intermittent unidirectional rotation may be imparted to said hammer and piston member during its reciprocation, reversing means for said reversible means, and means disposed remotely from said body for controlling said reversing means.

14. In a hydraulic percussion type rock drill, the combination of an elongated body having upper and lower ends and provided with a cylinder extending longitudinally therein, a combined hammer and piston member reciprocable in said cylinder and including an upper piston portion and a lower hammer portion adapted to impact against a drill rod at the lower end of said body at the end of the downstroke of said member, means for directing liquid under presssure into said cylinder alternately above and below said piston portion whereby to reciprocate said member, a non-slidable but rotatable rifle bar journalled in the upper end of said body and having said piston portion of said member slidable thereon, means provided in said piston portion and on said rifle bar for imparting rotation to said rifle bar alternately in opposite directions during the respective upstroke and downstroke movements of said member, reversible means for selectively permitting rotation of the rifle bar in one direction and preventing rotation thereof in the oposite direction whereby intermittent uni-directional rotation may be imparted to said hammer and piston member during its reciprocation, reversing means for said reversible means, means disposed remotely from said body for controlling said reversing means, said reversible means includes an internally toothed ring rigid with said body, a pair of oppositely acting pawls pivotally carried by said rifle bar, a plate oscillatory with respect to and coaxial with said rifle bar, and a pair of arcuate flanges provided on said plate and cooperating with the respective pawls whereby either pawl may operatively engage the teeth of said ring while the other is disengaged therefrom by selectively moving said plate to opposite positions at the ends of its oscillatory movement, said reversing means comprising a pair of oppositely acting power cylinders operatively engageable with said plate for moving the same selectively to said opposite positions, and said means for controlling said reversing means comprising a valve disposed remotely from said body and operatively connected to said power cylinders for directing fluid under pressure selectively thereto.

References Cited by the Examiner

UNITED STATES PATENTS

| | | | |
|---|---|---|---|
| 1,166,028 | 12/15 | Wilkinson | 121—150 |
| 1,598,426 | 8/26 | Ditson | 121—13 X |
| 2,113,161 | 4/38 | Osborne. | |
| 2,214,816 | 9/40 | Harrington. | |
| 2,224,956 | 12/40 | Ernst et al. | 60—51 |
| 2,279,057 | 4/42 | Reed | 60—52 |
| 2,493,298 | 1/50 | Lear | 121—19 |
| 2,541,958 | 2/51 | Deardorf et al. | |

(Other references on following page)

UNITED STATES PATENTS

| | | | |
|---|---|---|---|
| 2,555,427 | 6/51 | Trautman | 60—51 |
| 2,572,748 | 10/51 | Noll et al. | 60—52 |
| 2,669,840 | 2/54 | Joy | 60—51 |
| 2,726,640 | 12/55 | Fuehrer | 121—13 X |
| 2,731,796 | 1/56 | Sublett et al. | 60—51 |
| 2,881,739 | 4/59 | Huppert | 60—51 X |
| 2,910,046 | 10/59 | Lear | 121—7 |

FOREIGN PATENTS

| | | |
|---|---|---|
| 639,819 | 12/36 | Germany. |
| 798,748 | 7/58 | Great Britain. |

JULIUS E. WEST, *Primary Examiner.*

SAMUEL LEVINE, *Examiner.*